(12) United States Patent
Tan et al.

(10) Patent No.: US 11,118,622 B2
(45) Date of Patent: Sep. 14, 2021

(54) COMPRESSOR HAVING CURVED CONNECTING RODS

(71) Applicants: Yu Tan, Huizhou (CN); Shiyuan Tan, Huizhou (CN)

(72) Inventors: Yu Tan, Huizhou (CN); Shiyuan Tan, Huizhou (CN)

(*) Notice: Subject to any disclaimer, the term of this patent is extended or adjusted under 35 U.S.C. 154(b) by 0 days.

(21) Appl. No.: 16/967,184

(22) PCT Filed: Jan. 14, 2019

(86) PCT No.: PCT/CN2019/000008
§ 371 (c)(1),
(2) Date: Aug. 4, 2020

(87) PCT Pub. No.: WO2019/153976
PCT Pub. Date: Aug. 15, 2019

(65) Prior Publication Data
US 2021/0079949 A1 Mar. 18, 2021

(30) Foreign Application Priority Data
Feb. 6, 2018 (CN) .......................... 201810151909.5

(51) Int. Cl.
*F16C 7/02* (2006.01)
*F04B 39/00* (2006.01)

(52) U.S. Cl.
CPC .......... *F16C 7/023* (2013.01); *F04B 39/0022* (2013.01); *F16C 7/02* (2013.01); *F04B 39/0094* (2013.01)

(58) Field of Classification Search
CPC .. F16C 7/02; F16C 7/023; F16C 7/026; F16C 7/08; F04B 39/0022; F04B 39/0094; F04B 39/122
See application file for complete search history.

(56) References Cited

U.S. PATENT DOCUMENTS

| | | | | |
|---|---|---|---|---|
| 33,902 A | * | 12/1861 | Pollock | ................... F16C 7/023 74/594 |
| 145,752 A | * | 12/1873 | Prosser | ................... F16C 7/023 74/594 |
| 1,786,934 A | * | 12/1930 | Briggs | ................... F16C 7/023 403/38 |

(Continued)

FOREIGN PATENT DOCUMENTS

| CN | 2890374 Y | 4/2007 |
|---|---|---|
| CN | 101718225 A | 6/2010 |

(Continued)

*Primary Examiner* — Adam D Rogers
(74) *Attorney, Agent, or Firm* — Li & Cai Intellectual Property (USA) Office

(57) ABSTRACT

A compressor having curved connecting rods, comprising cylinders (8), pistons (9), piston pins (10), curved connecting rods (11), a swing rod (12), a crank pin (13), a crankshaft (14) and the other components; when the compressor having curved connecting rods works, a power machine driving the crankshaft (14) to rotate, the rotation of the crankshaft (14) driving the crank pin (13) to push the swing rod (12) to swing left and right, and the movement, towards the left and right, of the swing rod (12) driving the curved connecting rods (11) and the pistons (9) to reciprocate within the cylinders (8) and perform work in a compression manner.

1 Claim, 2 Drawing Sheets

(56) References Cited

U.S. PATENT DOCUMENTS 1,797,493 A * 3/1931 Baxter ................ F04B 39/0022
74/44
7,021,270 B1 * 4/2006 Stanczyk ................ F02B 75/32
123/197.3

FOREIGN PATENT DOCUMENTS

| CN | 102650278 A | 8/2012 |
| CN | 202645664 U | 1/2013 |
| CN | 20790603 U | 9/2018 |
| WO | WO 2016/142613 A1 | 9/2016 |

* cited by examiner

COMPRESSOR HAVING CURVED CONNECTING RODS

FIELD OF THE DISCLOSURE

The present disclosure relates to a compressor having curved connecting rods, in particular, to a newly-invented compressor having curved connecting rods.

BACKGROUND OF THE DISCLOSURE

FIG. 1 and FIG. 2 are schematic diagrams of existing compressor products. As shown in FIG. 1 and FIG. 2, the main structure of the existing compressor includes the cylinder 1, the piston 2, the piston pin 3, the connecting rod 4, the swing rod 5, the crank pin 6, the crankshaft 7 and other structures of the compressor. The crank pin 6 is installed in the sliding groove 18 of the swing rod 5, and the connecting rod 4 is rectangular. When the compressor works, a power machine drives the crankshaft 7 to rotate, the rotation of the crankshaft 7 drives the crank pin 6 to push the swing rod 5 to swing left and right, and the movement, towards the left and right, of the swing rod 5 drives the connecting rod 4 and the piston 2 to reciprocate within the cylinder 1 and perform work in a compression manner. The compressed air generated by the compression work is discharged through the exhaust hole for use. In the compressor of the structure, since the distance L from the center of the crankshaft 7 to the center of the crank pin 6 is short, the stroke of the piston 2 is small and the amount of air exhaust is small, which is ineffective; in addition, increasing the distance L from the center of the crankshaft 7 to the center of the crank pin 6 is limited by the connecting rod of the compressor. Further, a centerline A of the connecting rod 4 overlap a centerline A of a piston pin hole 16 and an assembly hole 17 so that an angle between the centerline A of the connecting rod 4 and a centerline S of the cylinder 1. This causes a large lateral pressure in a direction toward the wall of the cylinder 1, an intense friction generated on the hole of the cylinder 1 and the surface of the piston 2, and expands the sealing space between the hole of the cylinder 1 and the piston 2, reducing the working efficiency of the compressor. Through continuous researches and experiments, the inventor has invented a compressor having curved connecting rods that can increase the distance from the center of the crankshaft to the center of the crank pin without being limited by the connecting rod of the compressor, thereby increasing the stroke of the piston and raising the amount of air exhaust of the compressor, so as to make a huge contribution to the technological innovation of the compressor.

SUMMARY OF THE DISCLOSURE

A compressor having curved connecting rods is provided, including cylinders 8, pistons 9, piston pins 10, curved connecting rods 11, a swing rod 12, a crank pin 13, a crankshaft 14 and a machine base 15. The machine base 15 is equipped with swing rod 12. One end of the curved connecting rod 11 is assembled on the swing rod 12. The other end of the curved connecting rod 11 is connected to the piston 9 through the piston pin 10. The piston 9 is assembled in the cylinder 8. Then, the crank pin 13 is assembled in the sliding groove 19 of the swing rod 12. The curved connecting rod 11 is formed by a rigid connection between the first part 111, second part 112 and third part 113 of the curved connecting rod 11. The end portion 111T of the first part 111 of the curved connecting rod 11 is connected to the end portion 112F of the second part 112 of the curved connecting rod 11. The end portion 112G of the second part 112 of the curved connecting rod 11 is connected to the end portion 113E of the third part 113 of the curved connecting rod 11 at a bend to form a curved apex of the curved connecting rod 11. A piston pin hole 16 is disposed at the end portion 111N of the first part 111 of the curved connecting rods 11. An assembly hole 17 is disposed at the end portion 113V of the third part 113 of the curved connecting rod 11. The piston pin hole 16 and the assembly hole 17 are assembled along the same centerline A. A centerline B is a centerline of the first part 111 of the curved connecting rods 11 and is in connection with the piston pin hole 16. The first part 111 of the curved connecting rod 11 extends along the centerline B. A centerline C is a centerline of the second part 112 of the curved connecting rod 11, along which the second part 112 of the curved connecting rod 11 extends. A centerline D is a centerline of the third part 113 of the curved connecting rod 11 and is in connection with the assembly hole 17. The third part 113 of the curved connecting rod 11 extends alone the centerline D. The centerline B and the centerline C are in connection with the centerline D. The centerline A and centerline C form an angle R1. The centerline A and centerline D form an angle R2. The centerline B and centerline A form an angle R3.

In the present disclosure, a swing rod is installed in the machine base, one end of the curved connecting rods is assembled on the swing rod, the other end of the curved connecting rods is connected to the pistons through the piston pins, and the pistons are installed in the cylinders. When the compressor works, a power machine drives the crankshaft to rotate, the rotation of the crankshaft drives the crank pin to push the swing rod to swing left and right, and the movement, towards the left and right, of the swing rod drives the curved connecting rods and the pistons to reciprocate within the cylinders and perform work in a compression manner. The compressed air generated by the compression work is discharged through the exhaust hole for use. Since the curved connecting rods of the compressor having curved connecting rods avoid the position of the crank pin, the distance from the center of the crankshaft to the center of the crank pin is increased, the stroke of the pistons is increased, and the amount of air exhaust is increased, so that the compressor having curved connecting rods provided by the present disclosure makes a huge contribution to the technological innovation of the compressor.

BRIEF DESCRIPTION OF THE DRAWINGS

The present disclosure will be described in detail below with reference to the drawings of the embodiments of the present disclosure. The embodiments of brief description of the drawings are exemplary and intended to explain the present disclosure, and should not be construed as limiting the present disclosure.

DETAILED DESCRIPTION OF THE EXEMPLARY EMBODIMENTS

Figure 1:
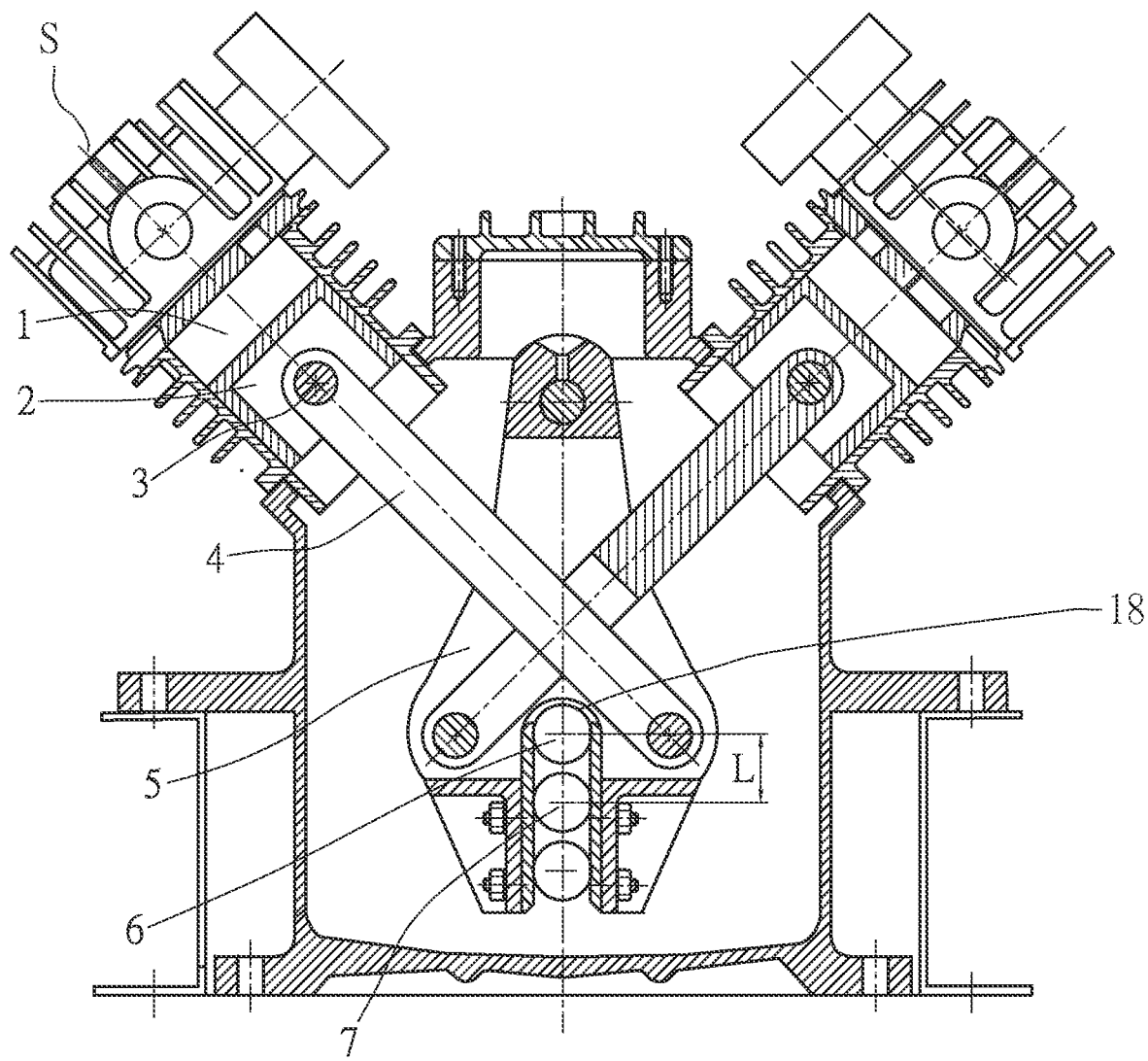
FIG. 1 is a schematic front view of the structure of a conventional compressor.
Figure 2:
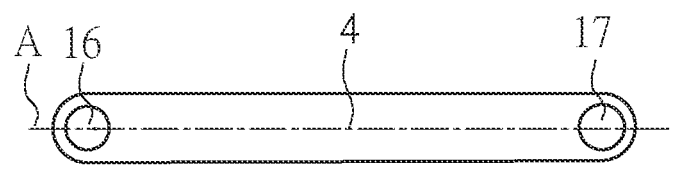
FIG. 2 is a schematic diagram of the structure of the connecting rod of the existing compressor product.
Figures 3, 4:
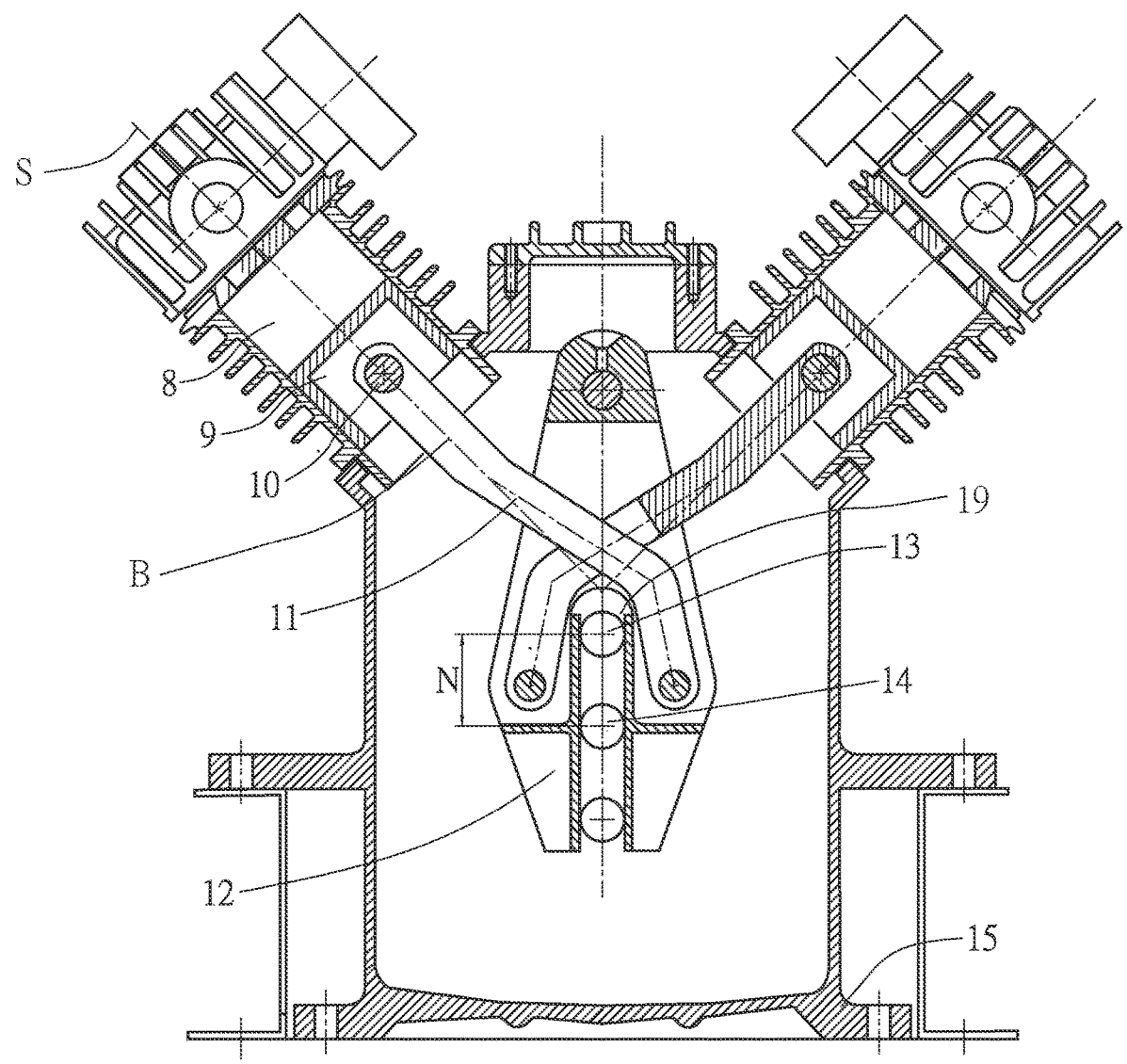
FIG. 3 is a schematic front view of the structure of the compressor having curved connecting rods.
FIG. 4 is a schematic diagram of the structure of the curved connecting rods of the compressor having curved connecting rods.

Referring to FIGS. 1 to 4, in FIG. 3, a swing rod 12 is installed in a machine base 15, one end of a curved connecting rod 11 is mounted on the swing rod 12, the other end of the curved connecting rod 11 is connected to a piston 9 through a piston pin 10. The piston 9 is assembled in the cylinder 8, and the crank pin 13 is assembled in the sliding groove 19 of the swing rod 12. When the curved connecting rod 11 of the compressor works, the power machine drives the crank pin 13 to rotate, and the rotation of the crankshaft 14 drives the crank pin 13 to push the swing rod 12 to swing left and right, and the movement, towards the left and right, of the swing rod 12 drives the curved connecting rod 11 and the piston 9 to reciprocate within the cylinder 8 and perform work in a compression manner. The compressed air generated by the compression work is discharged through the exhaust hole for use. Since the curved connecting rods 11 of the compressor having curved connecting rods avoid the position of the crank pin 13, the problem that the crank pin 13 is limited by the connecting rod of the compressor is thus solved so that the distance N from the center of the crankshaft 14 to the center of the crank pin 13 is increased. The distance from crankshaft 14 to the center of the crank pin 13 is increased, the stroke of the pistons 8 is increased, and the amount of air exhaust is increased. In FIG. 4, the curved connecting rod 11 is formed by a rigid connection between the first part 111, second part 112 and third part 113 of the curved connecting rod 11. The end portion 111T (first end portion) of the first part 111 of the curved connecting rod 11 is connected to the end portion 112F (first end portion) of the second part 112 of the curved connecting rod 11. The end portion 112G (second end portion) of the second part 112 of the curved connecting rod 11 is connected to the end portion 113E (first end portion) of the third part 113 of the curved connecting rod 11 at a bend to form a curved apex of the curved connecting rod 11. A piston pin hole 16 is formed at the end portion 111N (second end portion) of the first part 111 of the curved connecting rods 11. An assembly hole 17 is formed at the end portion 113V (second end portion) of the third part 113 of the curved connecting rod 11. The piston pin hole 16 is assembled along the same centerline A (first centerline). A centerline B (second centerline) is a centerline of the first part 111 of the curved connecting rod 11 and is in connection with the piston pin hole 16. The first part 111 of the curved connecting rod 11 extends along the centerline B. A centerline C (third centerline) is a centerline of the second part 112 of the curved connecting rod 11, along which the second part 112 of the curved connecting rod 11 extends. A centerline D (fourth centerline) is a centerline of the third part 113 of the curved connecting rod 11, along which the third part 113 of the curved connecting rod 11 extends. The centerline B and the centerline C are in connection with the centerline D. The centerline A and centerline C form an angle R1 (first angle). The centerline A and centerline D form an angle R2 (second angle). The centerline B and centerline A form an angle R3 (third angle). The angle R3 formed between the centerline B of the first part and centerline A can adjust the angle between the curved connecting rod 11 and centerline S of the cylinder 8, and obtain the smallest angle between the centerline S of the cylinder 8 and the centerline B of the first part 111 of the curved connecting rod 11.

The embodiments described above are merely preferred embodiments of the present disclosure and are not intended to limit the scope of the present disclosure. The present disclosure can produce various types and models of products of a compressor having curved connecting rods, which are within the scope of the gist of the present disclosure. Any equivalent changes or modifications made within the scope of the gist of the present disclosure, the use of the principle of the compressor having curved connecting rods, various compressor products with the technical features of the compressor having curved connecting rods, or based on the present disclosure, improvements and replacements using techniques known in the art should be included in the scope of the patent protection of the present disclosure.

In summary, since the curved connecting rods of the compressor having curved connecting rods provided by the present disclosure avoid the position of the crank pin, the problem that the crank pin is limited by the compressor connecting rods is solved, so that the distance from the center of the crankshaft to the center of the crank pin is increased, the stroke of the pistons is increased, and the amount of air exhaust of the compressor is raised. Consequently, the compressor having curved connecting rods provided by the present disclosure makes a huge contribution to the technological innovation of the compressor.

What is claimed is:

1. A compressor having curved connecting rod, comprising
    a cylinder;
    a piston assembled in the cylinder;
    a piston pin;
    a swing rod;
    a crank pin assembled in a sliding groove of the swing rod;
    a crankshaft;
    a machine base equipped with the swing rod; and
    a curved connecting rod of which one end is assembled on the swing rod and the other end is connected to the piston through the piston pin,
    wherein the curved connecting rod is formed by a first part, a second part and a third part,
    wherein a first end portion of the first part of the curved connecting rod is connected to a first end portion of the second part of the curved connecting rod, and a second end portion of the second part of the curved connecting rod is connected to a first end portion of the third part of the curved connecting rod at a bend to form a curved apex of the curved connecting rod,
    wherein a piston pin hole is formed at a second end portion of the first part of the curved connecting rod, and an assembly hole is formed at a second end portion of the third part of the curved connecting rod, and
    wherein the piston pin hole and the assembly hole are assembled along a same first centerline, a second centerline is a centerline of the first part of the curved connecting rod and is in connection with the piston pin hole, the first part of the curved connecting rod extends along the second centerline, a third centerline is a centerline of the second part of the curved connecting rod, the second part of the curved connecting rod extends along the third centerline, a fourth centerline is a centerline of the third part of the curved connecting rod, the third part of the curved connecting rod extends along the fourth centerline, the second centerline and the third centerline are in connection with the fourth centerline, the first centerline and the third centerline form a first angle, the first centerline and fourth centerline form a second angle, and the second centerline and first centerline form a third angle.

* * * * *